Figure 1:
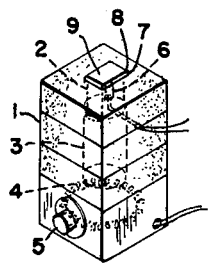

Feb. 23, 1965 A. G. SANDS 3,170,811
PRODUCTION OF FUSED POLYTETRAFLUOROETHYLENE FILM ON ELASTOMERS
Filed Feb. 28, 1962

INVENTOR
ARTHUR G. SANDS

BY

ATTORNEYS

United States Patent Office 3,170,811
Patented Feb. 23, 1965

3,170,811
PRODUCTION OF FUSED POLYTETRAFLUORO-
ETHYLENE FILM ON ELASTOMERS
Arthur G. Sands, Cheverly, Md., assignor to the United
States of America as represented by the Secretary of
the Navy
Filed Feb. 28, 1962, Ser. No. 176,459
6 Claims. (Cl. 117—71)
(Granted under Title 35, U.S. Code (1952), sec. 266)

The invention described herein may be manufactured and used by or for the Government of the United States or America for governmental purposes without the payment of any royalties thereon or therefor.

This invention relates to a method of providing a thin film of fused polytetrafluoroethylene on elastomers and to the new elastomer articles.

Elastomers, characteristically, have a high coefficient of friction and under frictional conditions of use will incur a high rate of wear of the contact surface. A dry lubricant film on the contact surface of the elastomer would reduce frictional wear and lengthen the service life of the elastomer.

Polytetrafluoroethylene is a waxy solid of low coefficient of friction which as a sintered or fused thin film has been used on metal surfaces as a dry lubricant. Sintering or fusing of the polytetrafluoroethylene involves heating the metal substrate carrying an air-dried thin film of the polymer which had been previously sprayed on the metal surface from an aqueous dispersion of finely divided polytetrafluoroethylene to a temperature above the fusion point of polytetrafluoroethylene which is 327° C. or 621° F. Fusion causes the polymer particles in the film to coalesce which increases the strength of the film and gives better adhesion of the film to the metal.

The method of fusing polytetrofluoroethylene films on metal as described above is obviously not appropriate for fusion of films of the polymer on elastomers due to the adverse effect of the high degree of heat on the physical properties of elastomers.

It is an object of the present invention to provide a method for forming a thin film of fused polytetrafluoroethylene on elastomers without appreciably affecting the physical properties of the elastomer substrate. It is also an object to provide new elastomer articles which are characterized by having a surface of low coefficient of friction.

The above and other objects are accomplished by the practice of the method of my invention which comprises coating the elastomer surface with a thin film of bright metal, coating the metal film with a thin film of polytetrafluoroethylene from an aqueous dispersion of the polymer, air-drying the polymer film and heating the dried polymer film to fusion by applying heat directed solely to the metal-polymer coated surface of the elastomer substrate.

In operation of the method of the invention, the bright metal film reflects heat away from the elastomer substrate back into the film of polytetrafluoroethylene protecting the elastomer from injury by heat and concentrating heat in the polytetrafluoroethylene layer. This heat return accelerates attaining of fusion temperatures in the polymer layer. Any bright metal, such as aluminum, silver, gold, etc., may be used for the heat reflecting film. Suitable thicknesses for the metal film on the elastomer substrate are of the order of from about 500 to 1000 Angstroms. The metal film may be coated on the elastomer substrate by a conventional process which has been used for metal coating of plastic articles. In this conventional metal coating process, the metal is evaporated and the vapor deposited on the elastomer substrate in a high vacuum. A baffle is interposed between the elastomer substrate and the heating wire carrying the metal and is withdrawn after pump-down and evaporation of the metal has been effected to allow depositing of metal on the substrate.

The polytetrafluoroethylene may be applied to the bright metal film on the elastomer substrate by spraycoating, using an aqueous dispersion of finely divided polytetrafluoroethylene sold commercially under the tradename Teflon. The thickness of the polymer coating may be of the order of from about 0.2 to 0.4 mil. The spray coat is then dried to remove water which may be carried out by standing in the air at room temperature but which preferably is accelerated by heating in a forced-air circulating oven.

Fusion of the dried polymer film on the metal coated elastomer substrate may be carried out by supporting the substrate with the metal-polymer coated side face down toward and spaced from an electric heater provided with a temperature control. A simple apparatus for the purpose as shown diagrammatically in FIGURE 1 of the accompanying drawing is a unit of refractory 1 material such as fire brick which is open at the top 2 and has a vertically arranged passageway 3 leading from this opening to an electric heating coil 4 equipped with a rheostat 5. The elastomer substrate is placed on the top of the heating unit with the metal-polymer coating arranged over the opening to face the uprising radiant heat. A thermocouple 6 is placed in the vertical passageway a short distance below the top of the heating unit to measure the temperature of the heat near the polytetrafluoroethylene film. Fusion of the polymer film generally will take place within a period of 2 to 4 minutes depending upon the temperature of the applied heat, which, suitably, may range from above the fusion temperature of the polymer up to about 920° F. Fusion of the polymer is to be observed by noting a duller appearance in the polymer film from the original. The fused film may be quickly cooled by quenching in water.

Figure 2:
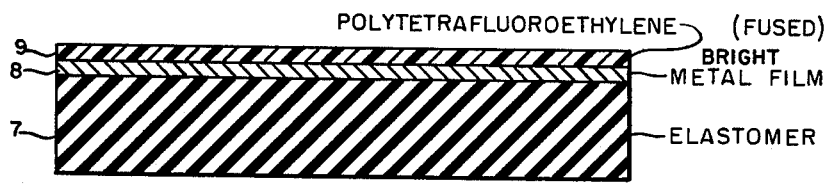

In FIGURE 2 of the accompanying drawing is shown by way of illustration an elastomer article of the invention provided with a surface of low coefficient of friction in the form of a fused film of polytetrafluoroethylene. The elastomer substrate which may be a cured natural or synthetic rubber is shown at 7 coated with a thin film of bright metal 8 on which is a fused thin film of polytetrafluoroethylene 9.

The invention is further illustrated by the following specific examples of the application of the method. Parts are by weight.

*Example 1*

A sheet of vulcanized neoprene rubber was prepared by compounding 100 parts neoprene GNA (polychloroprene) with 30 parts fine thermal carbon black (P33, R. T. Vanderbilt), 4 parts magnesium oxide, 5 parts zinc oxide and 0.5 part stearic acid and curing at 300° F. for 30 minutes in a tensile mold, 6" x 6" x .070". The vulcanized neoprene sheet was coated on one side with a film of aluminum, 500 to 1000 Angstroms thick, by the above-described vacuum evaporation-vapor deposition process. A commercial aqueous disperson of polytetrafluoroethylene (Du Pont Teflon One Coat Enamel 851–204) of pH 1.5 and containing phosphoric acid, chromic acid and a solids concentration of about 50% by weight and of the kind described in U.S. Patent 2,562,118 to Osdal was sprayed to the metal film to deposit a film of the polymer of 0.3 mil thickness. The film of polymer was dried by subjecting it on the neoprene substrate to room air drying overnight, to oven air drying for 2 hours at 200° F. and again for 2 hours at 300° F. The coated sheet was cut into six sample strips of equal size. Three of the samples, 1, 2 and 3, were set aside as controls. The other three, 4, 5 and 6, were subjected to fusion of the polytetrafluoroethylene film using a heating apparatus as described above. The temperature of the applied heat was varied and measured by means of a thermocouple inserted in the upper portion of the heat passageway directly beneath and about ¼ inch below the polymer coating on the neoprene substrate which was faced down toward the heat rising from an electrical heating coil. Each of the samples 4, 5 and 6 was heated for two minutes at the temperatures set forth below and then quenched in water.

| Sample | Temp. Start, °F. | Temp. After 2 min., °F. | Average Temp., °F. |
|---|---|---|---|
| 4 | 840 | 913 | 865 |
| 5 | 855 | 913 | 874 |
| 6 | 871 | 920 | 884 |

The samples coated with the polymer film not fused were compared to the samples coated with the fused polymer film by a friction test in which pressure-sensitive tape (Scotch tape) was affixed to the polymer film and then pulled off. The polymer film was colored green by virtue of the color of the starting aqueous dispersion of polytetrafluoroethylene. On pulling the pressure-sensitive tape from the unfused polymer film of samples 1, 2 and 3, the green colored polymer film came away with the tape, whereas in the case of the fused polymer films of samples 4, 5 and 6, the green colored polymer film did not come off but remained on the metal film with the neoprene substrate.

*Example 2*

A sheet of peroxide cured silicone rubber containing red iron oxide (about 2 parts) and fine silica (General Electric Silicone Rubber 371) was coated on one side with a thin film of aluminum and the aluminum film spray coated with a thin film of polytetrafluoroethylene, all as set forth in Example 1. The polymer film was dried on the silicone rubber substrate by overnight drying at room temperature, followed by air-circulating oven drying at 200° F. for 1 hour, at 300° F. for 1 hour and at 500° F. for one-half hour. The metal and polymer coated silicone rubber sheet, measuring 6" x 6" x .075", was cut into 1" x 2" strips half of which were reserved as controls and the other half subjected to fusion of the polymer film in the manner of Example 1. The temperature of the applied heat as measured by the thermocouple located just below the polymer coating on the silicone rubber substrate was 425° C. The time for fusion was four minutes. The fused samples were quenched in water. The pressure-sensitive tape test was applied to the polymer film on each of the samples, both fused and unfused. The results were similar to those set forth in Example 1, with the fused polymer film remaining on the metal film with the silicone rubber substrate and the unfused polymer film coming away with the tape.

In the manner of the above examples, a surface of low coefficient of friction in the form of a thin film of fused polytetrafluoroethylene can be applied to various other elastomers including, for example, vulcanized butadiene-styrene (GRS) and vulcanized butadiene-nitrile (GRN) in addition to vulcanized natural rubber.

The new elastomer products of the invention provided with a thin adherent film of fused polytetrafluoroethylene may take the shape of strips applied to metal surfaces to prevent seizing between the parts, or sleeves for rotating or sliding parts to provide a dry lubricant, reducing friction on movement of the parts.

Since the invention described herein may be variously practiced without departing from the spirit or scope thereof, it is to be understood that specific embodiments appearing in the above description are to be taken by way of illustration and not in limitation except as may be defined in the appended claims.

What is claimed is:
1. A method of providing a thin film of fused polytetrafluoroethylene on an elastomer which is adversely affected in physical properties by the high degree of heat required to fuse polytetrafluoroethylene which comprises coating a thin film of bright metal on a surface of the elastomer, coating a thin film of polytetrafluoroethylene on said metal film from an aqueous dispersion of finely divided polytetrafluoroethylene, air-drying said film of polytetrafluoroethylene and fusing said dried film of polytetrafluoroethylene on said elastomer by directing heat solely thereto at a temperature above the fusion point of polytetrafluoroethylene.

2. A method as defined in claim 1, wherein the bright metal is aluminum.

3. An elastomer article comprising an elastomer substrate directly coated with a thin film of bright metal and having a thin film of fused polytetrafluoroethylene directly coated on said metal film.

4. An elastomer article as defined in claim 3, wherein the bright metal is aluminum.

5. An elastomer article comprising a substrate of vulcanized polychloroprene directly coated with a thin film of aluminum and having a thin film of fused polytetrafluoroethylene directly coated on said aluminum film.

6. An elastomer article comprising a substrate of vulcanized silicone rubber directly coated with a thin film of aluminum and having a thin film of fused polytetrafluoroethylene directly coated on said aluminum film.

References Cited by the Examiner

UNITED STATES PATENTS

| | | | |
|---|---|---|---|
| 2,613,193 | 10/52 | Osdal | 260—29.6 |
| 2,619,443 | 11/52 | Robinson | 117—221 |
| 2,751,314 | 6/56 | Keil | 117—161 |
| 2,764,505 | 9/56 | Kilbourne | 117—161 |
| 2,813,041 | 11/57 | Mitchell et al. | 117—161 |
| 2,866,769 | 12/58 | Happoldt | 260—29.6 |
| 2,923,651 | 2/60 | Petriello | 117—200 |
| 3,054,712 | 9/62 | Whitehurst | 117—77 |

RICHARD D. NEVIUS, *Primary Examiner.*